DATA ORGANIZATION TECHNIQUES

Filed Aug. 3, 1956 5 Sheets-Sheet 1

INVENTORS
THOMAS E. LAWRENCE
ROBERT C. KELNER
CHARLES W. GARDINER
ROBERT R. EVANS

BY Joseph Weingarten
ATTORNEY

DATA ORGANIZATION TECHNIQUES

Filed Aug. 3, 1956 5 Sheets-Sheet 2

INVENTORS
THOMAS E. LAWRENCE
ROBERT C. KELNER
CHARLES W. GARDINER
ROBERT R. EVANS

BY Joseph Weingarten
ATTORNEY

*INVENTORS*

THOMAS E. LAWRENCE
ROBERT C. KELNER
CHARLES W. GARDINER
ROBERT R. EVANS

BY Joseph Weingarten

*ATTORNEY*

INVENTORS
THOMAS E. LAWRENCE
ROBERT C. KELNER
CHARLES W. GARDINER
ROBERT R. EVANS

BY Joseph Weingarten
ATTORNEY

Sept. 18, 1962 T. E. LAWRENCE ETAL 3,054,987

DATA ORGANIZATION TECHNIQUES

Filed Aug. 3, 1956 5 Sheets-Sheet 5

INVENTORS
THOMAS E. LAWRENCE
ROBERT C. KELNER
CHARLES W. GARDINER
ROBERT R. EVANS

BY Joseph Weingarten
ATTORNEY

United States Patent Office 3,054,987
Patented Sept. 18, 1962

3,054,987

DATA ORGANIZATION TECHNIQUES

Thomas E. Lawrence, Cambridge, Robert C. Kelner, Concord, Charles W. Gardiner, Manchester, and Robert R. Evans, Bedford, Mass., assignors, by mesne assignments, to Laboratory for Electronics, Inc., Boston, Mass., a corporation of Delaware Filed Aug. 3, 1956, Ser. No. 601,921
10 Claims. (Cl. 340—172.5)

The present invention relates in general to information processing systems capable of operating on data units of variable length by utilizing new and improved methods of organizing said data units and means for implementing said methods.

The information which is to be processed may be stored in magnetic form on a storage file drum, the surface of each file drum containing a series of magnetic tracks. The units of data recorded on each track consist of data records, each record being further subdivided into blocks of data. The information in each block consists of words of data, each word being made up of data characters. As is well known in the art, each character may be encoded electrically in binary digit or bit form by One and Zero pulses for recording on the magnetic recording surface. A data word may represent any desired unit of information such as a number, a name etc. For example, the first word in a block of data descriptive of a factory employee may be his factory badge number, the second word may be his hourly pay, and the third word may be his last name, first name, and middle initial.

In prior systems, in order to avoid ambiguity, the respective data units e.g. words, blocks, etc. within data records descriptive of the same class of information, have been maintained of the same length by means of filler symbols. Thus, if in the respective data records of employees Smith and Jones the factory badge number of each employee is a three digit number and employee Smith receives an hourly pay of $1.22, this is indicated on the magnetic record by the symbols 1 2 2 following his factory badge number. Accordingly, if the name follows the badge number and the salary, the first letter of employee Smith's name will occupy seventh place in the series of characters so far recorded. If now, employee Jones receives $0.96 per hour, which is entered as 9 6 following his three digit factory badge number, it has heretofore been customary to insert a filler symbol, for example 0, in front of 9 6 in order that the first letter of employee Jones' name will also be the seventh character recorded. While such uniformity of data location is utilized in prior data processing techniques in order to avoid ambiguities, it is obvious that it limits the flexibility of the system as well as being wasteful of available recording space which may be more efficiently utilized.

A similar situation arises when one or more words are missing from a block of data, or when one or more data blocks are absent from a record. Where the inherent limitations of the data processing system demand uniformity in the physical location of respective data units descriptive of the same information, the new space which then becomes available will be taken up with filler symbols and the maximum capacity of the data storage system will not be utilized.

Accordingly, it is an object of this invention to provide data processing systems capable of utilizing the entire available recording space of the data storage medium.

It is a further object of this invention to provide techniques for variable length data unit organization.

It is another object of this invention to provide a method of data unit organization and means for implementing the same, capable of responding to the termination of respective data units of variable length in order to facilitate the processing of information within the system.

It is an additional object of this invention to provide a method of data unit organization and means for implementing the same capable of responding to a characteristic code indicative of the absence of one or more data units.

Briefly stated, the variable length data unit techniques which form the subject matter of this invention, comprise the use of characteristic recognition symbols to indicate the termination of respective data units, characteristic codes to indicate the absence of said data units, means respectively responsive to said symbols and codes, and means for comparing the output of said responsive means with a selected data unit to facilitate the further processing of data when a predetermined relationship exists between the compared quantities.

These and other novel features of the invention together with further objects and advantages thereof will become more apparent from the following detailed specification with reference to the accompanying drawings, in which:

FIGS. 2–5 illustrate one embodiment of the system for carrying out the invention, represented for convenience on separate drawings, wherein:

FIG. 2 illustrates the transfer link including gating means;

FIG. 3 illustrates the word detection apparatus;

FIG. 4 illustrates the block detection apparatus;

FIG. 5 illustrates the comparator, the gate control circuit and the absent data identification circuit;

Basically, the techniques which form the subject matter of this invention are dependent upon the ability of the apparatus herein employed to recognize the termination of a data unit regardless of its length. To this end, characteristic symbols are binarily encoded at the end of each data unit. In the instant case, it is convenient to follow the binary notation employed for the data characters and to encode the above mentioned characteristic symbols in the form of six binary bits.

Figure 1:
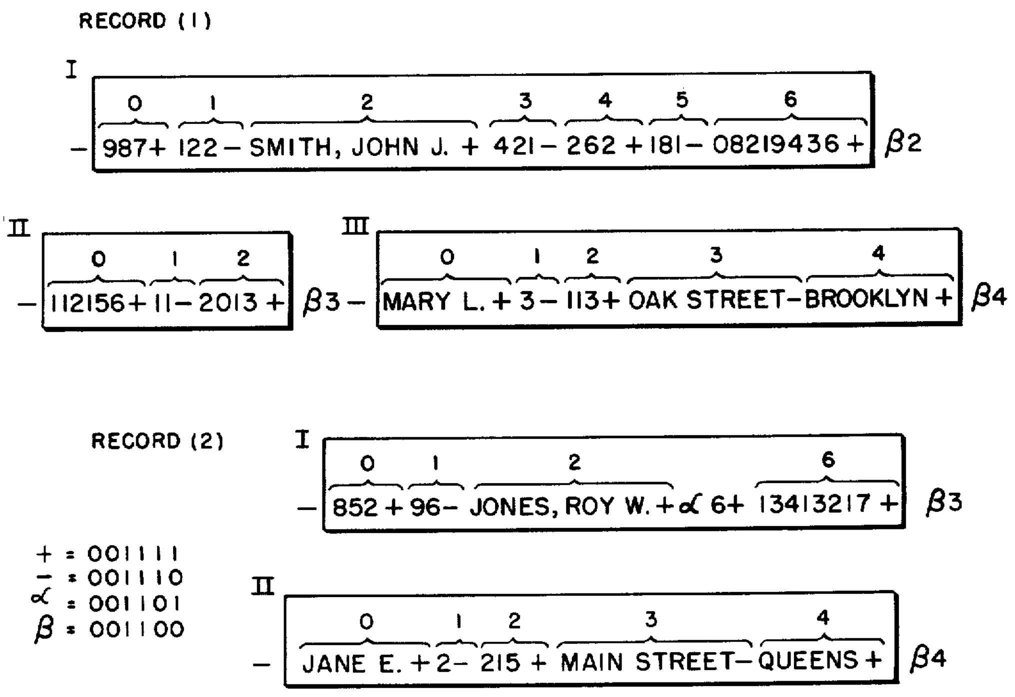
FIG. 1 illustrates the data unit organization of two employee records encoded on the drum recording surface.
Figure 7:
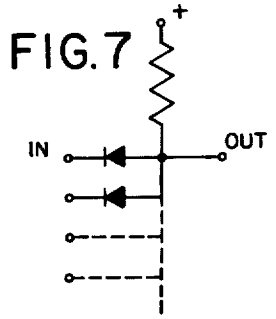
FIG. 7 illustrates an example of a gate circuit suitable for use as an "and" circuit in the apparatus of FIGS. 2–5.

With reference now to the drawings and particularly FIG. 1 thereof, two employee data records are shown which may or may not be located on the same magnetic track of the drum recording surface. Each record contains a sequence of data blocks which are sequentially numbered with Roman numerals in the drawing, for reference purposes. Each block contains a sequence of data words, the latter being numbered with Arabic numerals for reference purposes. As mentioned before, each data character is encoded in the magnetic medium in the form of six binary bits. The data records shown by way of example in FIG. 1 are those of two separate employees, the information represented by the words of each record being as follows.

Block I:

- Word 0—Employee factory badge number;
- Word 1—Hourly pay;
- Word 2—Last name, first name, middle initial;
- Word 3—Deduction from pay to be applied to Payroll Savings Plan;
- Word 4—Deduction from pay to be applied to Group Hospitalization Plan;
- Word 5—Deduction from pay to be applied to Employee Retirement Fund;
- Word 6—Social Security Number;

Block II:
Word 0—Date ending payroll week—month, day, year;
Word 1—Number of hours of overtime work for week;
Word 2—Overtime pay for week;
Block III:
Word 0—Wife's first name, middle initial;
Word 1—Number of children;
Word 2—Address—house number;
Word 3—Address—street name;
Word 4—Address—town or borough;

It will be seen that the information contained in Block I is such as to be of interest to the company payroll department and will remain relatively constant over a given period of time. The information contained in Block II is similarly of interest to the payroll department, but is subject to change in accordance with the weekly overtime requirements of the employee's particular department. Block III may be of interest to the personnel department and will remain relatively constant.

Each charcteristic (+) or (—) symbol shown in the drawing indicates the termination of the preceding word and is encoded at the end of each word, being a part thereof. While either a (+) or a (—) symbol will indicate the end of a word, both symbols are used in order to indicate algebraic sense for numeric words as well. The end of each block is indicated by a characteristic $\beta$ symbol. Additionally, an absent data unit code is provided wherein the occurrence of a characteristic $\alpha$ symbol following a (+) or (—) signal, as shown in Record (2), Block I of the drawing, indicates the absence of one or more words in the sequence of words within a block. The number encoded following the $\alpha$ symbol corresponds to the number of the first occurring word after the discontinuity in the above mentioned sequence of words and is, in turn, followed by a word end symbol. Thus, in the example shown, the occurrence of the code "$\alpha$6" indicates that the next occurring word after Word 2, will be Word 6.

In similar fashion, each $\beta$ signal is succeeded by the number of the next occurring block in the sequence of blocks within a record, the latter number being followed by a word end symbol. Accordingly, if one or more blocks are missing, this will be noted from the numbering. For example, the occurrence of the code "$\beta$3" in Record (2), indicates the next occurring block of data after Block I to be Block III.

By way of example, a binary code of characteristic (+), (—), $\alpha$ and $\beta$ symbols is shown in FIG. 1 which is suitable for use with the data discussed above.

Figure 6:
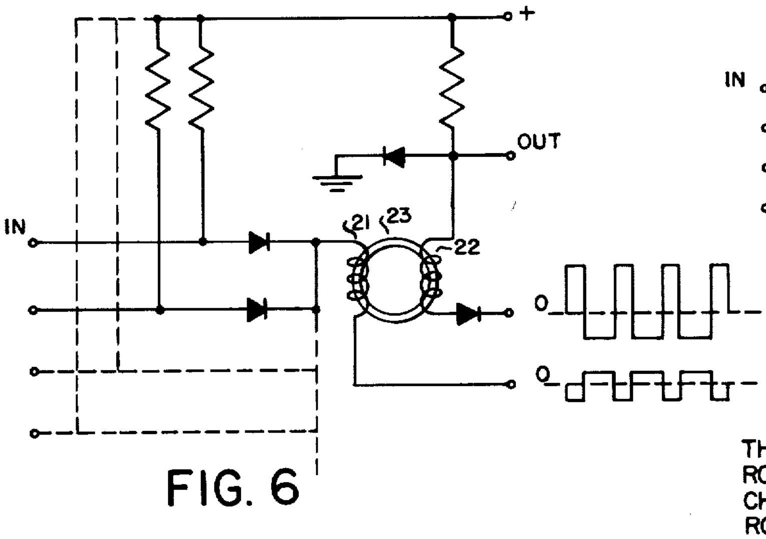
FIG. 6 illustrates an example of a voltage operated magnetic amplifier suitable for use as an "or" circuit in the apparatus of FIGS. 2–5.
Figure 2:
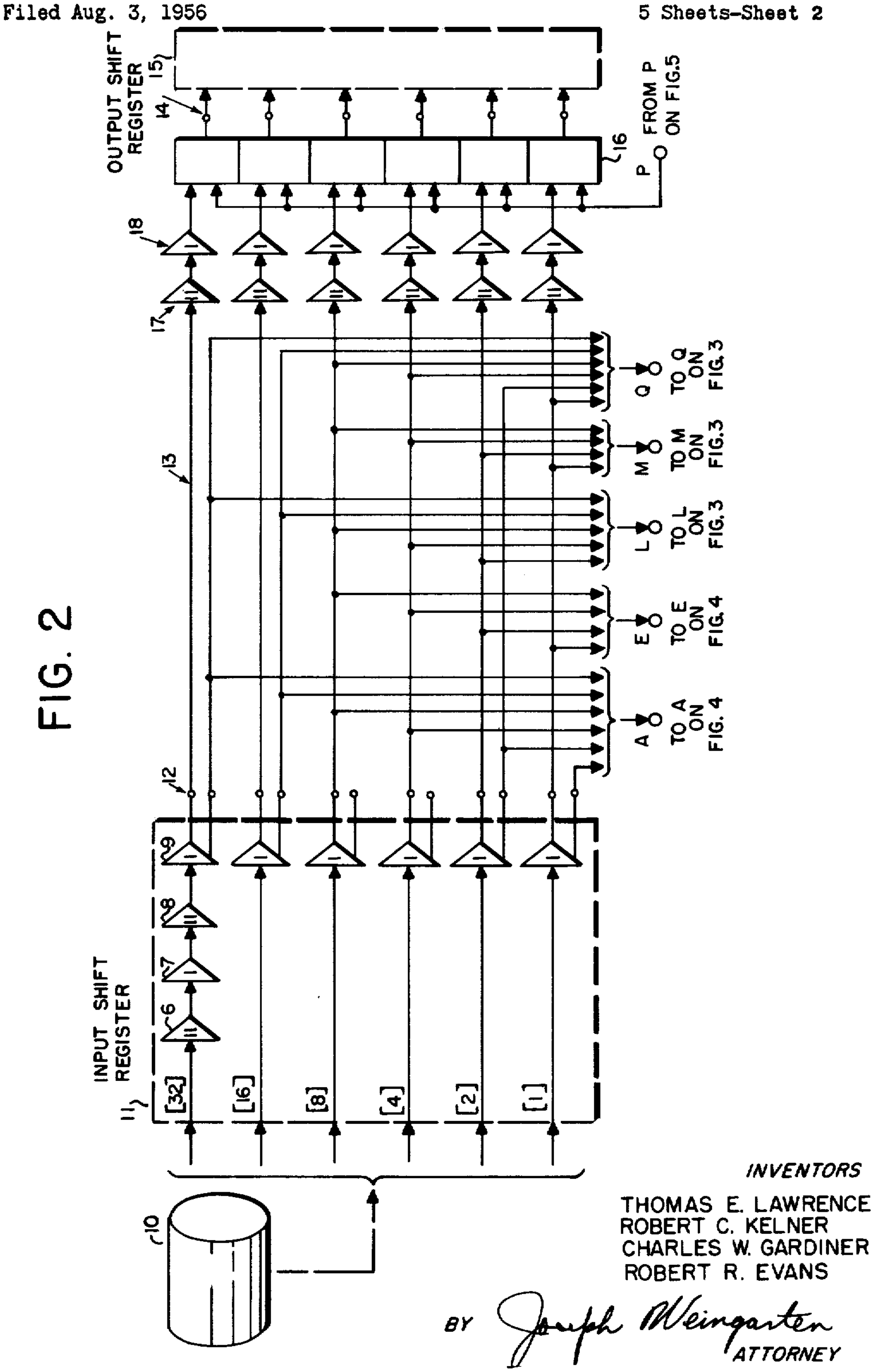

With reference now to FIGS. 2–7, FIG. 2 shows a storage drum 10 connected to input register 11. The latter register comprises a plurality of stages, each stage consisting of a voltage operated magnetic amplifier of the type shown in FIG. 6. As will be seen from the latter figure, the two windings 21 and 22 which are wound on magnetic core 23, are pulsed negatively out of phase with each other, the frequency of each series of pulses being equivalent to the frequency at which bits of data in the form of pulses are transferred through the amplifier. It will be seen that a delay of one half bit period occurs between the input and the output terminals of the amplifier. The input shown in FIG. 6 constitutes a buffer stage which enables the core of the amplifier to receive a plurality of input signals. This is indicated in FIGS. 2–5 by one or more arrows entering a triangle. Accordingly, such an amplifier becomes an "or" circuit by virtue of its ability to produce an output signal upon receiving one or more input signals. Respective amplifiers are denoted either as "1" or "2" amplifiers in FIGS. 2–5, depending on whether the windings are pulsed as shown in FIG. 6 or in reversed relationship. This notation affords a time comparison of what occurs throughout the circuit since all amplifiers denoted alike are pulsed simultaneously. The data in each amplifier channel of the input shift register shown in FIG. 2, travels through successive amplifier stages and is delayed by one half bit period in each stage. At the output of the last stage of each channel, direct as well as inverted output signals are applied to input terminals 12, direct signals being indicated in the drawing by an output lead originating at the apex of a triangle which denotes an amplifier, while signal inversion is indicated by an output lead originating at one of the legs of the triangle. An information transfer link 13 connects the input terminals to output terminals 14, the latter in turn being connected to output shift register 15. It will be seen that the number of separate paths within connection 13 depends upon the type of readout employed as well as on the complexity of the binary code utilized. Thus, a six path connection would be applicable where it is desired to read a six bit character simultaneously out of the storage medium. The numbers represented by the binary code bits of respective paths are indicated in FIG. 2 on each amplifier channel of input shift register 11. A serial connection between the two shift registers would require only a single path regardless of the number of bits per character. Also, where fewer bits are employed to denote a character, the number of parallel paths required will obviously be smaller. Gates 16 are connected intermediate the input and output terminals of connection 13, there being one gate per path. The gate circuits may be of the type shown in FIG. 7, i.e. "and" circuits. Accordingly, an input signal is required on all inputs in order for the gate to produce an output signal. Each gate 16 is preceded by amplifiers 17 and 18 in order to delay the data by one bit period.

Figure 3:
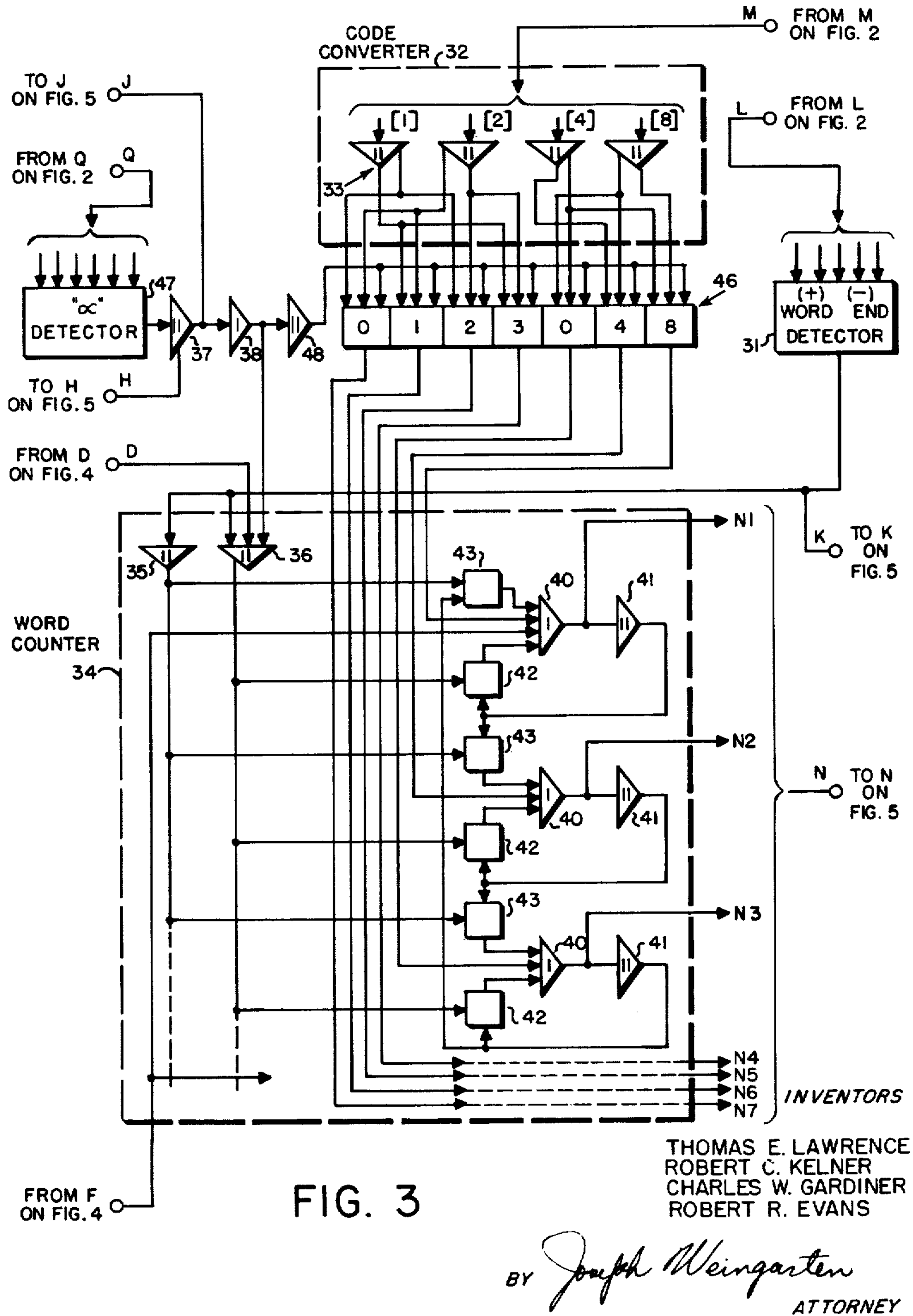

A word end detector 31, shown in FIG. 3, is connected to the direct signal input terminals of the 2, 4 and 8 channels and to the inverted signal input terminals of the 16 and 32 channels. Terminal "L" shows the corresponding connection between FIGS. 2 and 3. As shown in FIG. 1, the binary code which represents a characteristic (+) symbol is 001111 and that of a characteristic (—) symbol is 001110. Detector 31 is a gate so connected to the direct and inverted signal input terminals that it will be uniquely responsive to the occurrence of either symbol. The connection to the inverted signal input terminals prevents ambiguities in the case of binary numbers which include direct signals from the 2, 4 and 8 channels. Referring back to FIG. 3 now, the output of the word end detector is connected to a word counter 34 which may be a ring counter of the type shown. The counter utilized in this application comprises, in addition to the three subcircuit rings shown in the drawing, a second ring circuit having four subcircuits, indicated by their input and output connections in the drawing. The ring counter shown employs its own code in order to keep the counter circuitry to a minimum. Other types of counters are possible where that object is not of primary importance. Each subcircuit contains a "1" amplifier 40, the output of which is connected to a "2" amplifier 41. The output of amplifier 41 is connected to a gate 42, the output of which in turn connects to the input of amplifier 40 to complete the subcircuit. A gate 43 is connected between the output of amplifier 41 and the input of amplifier 40 in the next subcircuit. Amplifiers 35 and 36 receive the output of the word end detector. The direct output of amplifier 35 is connected to gates 43 and the reversed phase output of amplifier 36 is connected to gates 42. The output of amplifier 41 in the last subcircuit is connected to the first gate 43 to complete the ring circuit. The output signals of counter 34 are taken from the output of amplifiers 40. A code conversion unit 32 comprises amplifiers 33 which are connected to the direct signal terminals 12 in FIG. 2 of the 1, 2, 4 and 8 channels respectively, such connection being indicated by terminal "M." Each amplifier 33 has a direct and inverted signal output. Gates 46 receive the output signals of amplifiers 33 in such relationship as to pass on the signal codes 0, 1, 2, 3 and 0, 4, 8. The respective outputs of gates 46 are connected to amplifiers 40 of counter 34. An absent word detector 47 is a gate connected to input terminals 12 of FIG. 2. This connection is indicated by terminal "Q" and is such as to enable the word end detector to uniquely recognize the occurrence of a characteristic $\alpha$ signal, the binary code of which in the instant example is 001101, as shown in FIG. 1. The output signal of detector 47 is delayed one and one-half bit periods by amplifiers 37, 38 and 48, the direct signal output of the last mentioned amplifier being connected to each of gates 46. The direct signal output of amplifier 38 is connected to amplifier 36 in the word counter.

Figure 4:
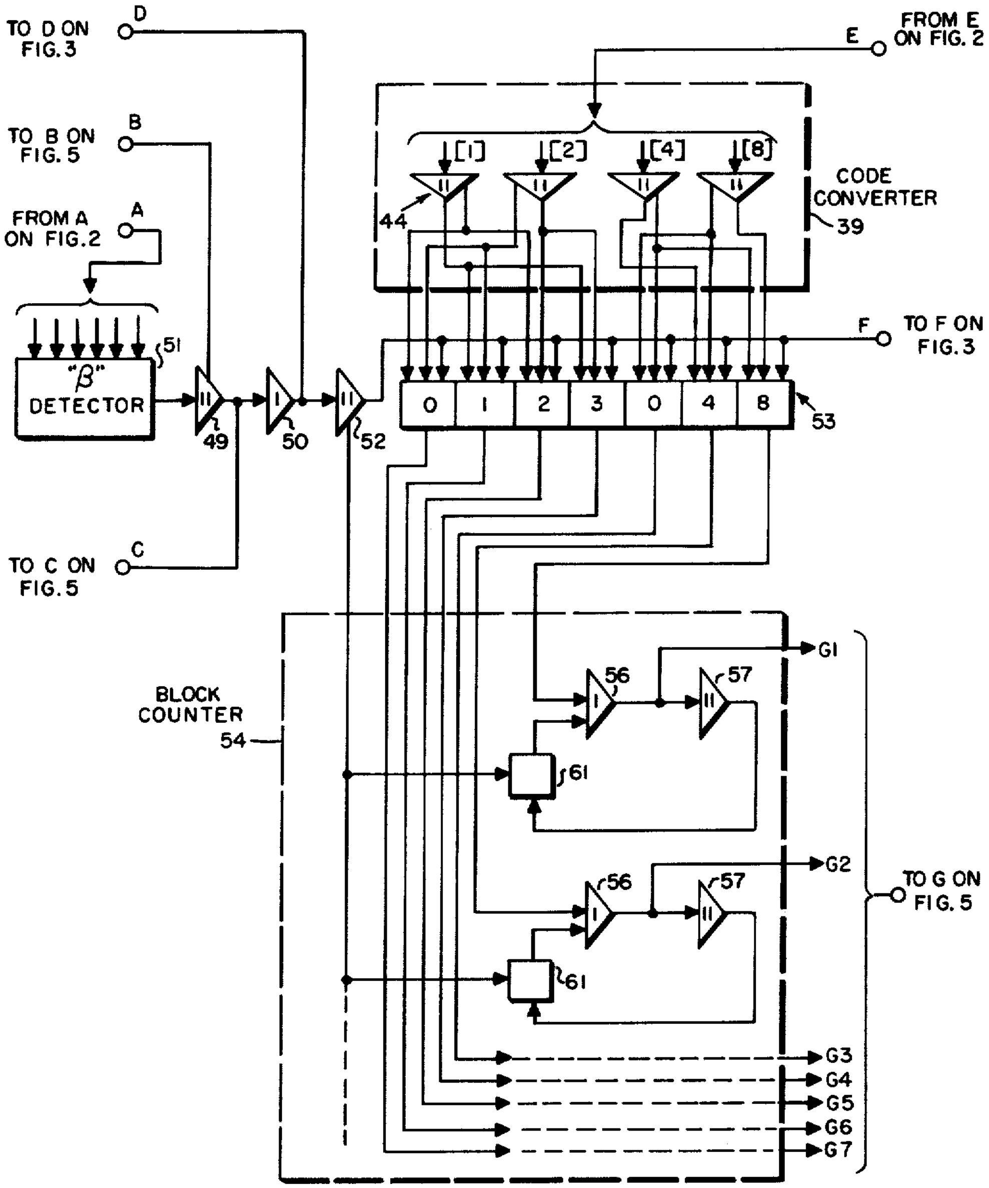

FIG. 4 shows a block end detector 51 which is a gate connected to input terminals 12 of FIG. 2 so as to uniquely recognize the occurrence of a characteristic $\beta$ signal which is written 001100, as seen from FIG. 1. Terminal "A" shows the corresponding connection between FIGS. 2 and 4. A code conversion unit 39 comprises amplifiers 44 having respective inputs connected to input terminals 12 of FIG. 2, as indicated by terminal "E." The connection is identical to that of amplifiers 33 in FIG. 3. Gates 53 are connected to the direct and inverted signal outputs of amplifiers 44 in the same way as gates 46, shown in FIG. 3, are connected to amplifiers 33. The output signal of detector 51 is delayed one and one-half bit periods by amplifiers 49, 50 and 52, the direct signal output of the last mentioned amplifier being connected to each of gates 53. The last mentioned output is further connected to the input of one of amplifiers 40 in each of the two ring circuits of word counter 34 shown in FIG. 3. This connection is indicated by terminal "F." The output of amplifier 50 is directly connected to the input of amplifier 36 in FIG. 3, the corresponding connection being indicated by terminal "D." A block counter 54 is connected to the output of gates 53 and comprises a plurality of subcircuits depending in number on the size of the decimal number which is to be indicated at the counter output and on the particular code employed. Each subcircuit consists of amplifiers 56 and 57, the latter being connected to the counter output. Gate 61 is connected to the output of amplifier 57, its own output being connected to the input of amplifiers 56 to complete the subcircuit. The inverted signal output of amplifier 52 is connected to each of gates 61. The output of counter 54 is taken from the output of amplifiers 56. Although the arrangement shown in the drawing is preferred for the sake of simplicity, it will be understood that counter 54 may be identical to counter 34 in FIG. 3, provided a block end symbol code equivalent to the word end symbol code is adopted and means are provided for detecting the same.

Figure 5:
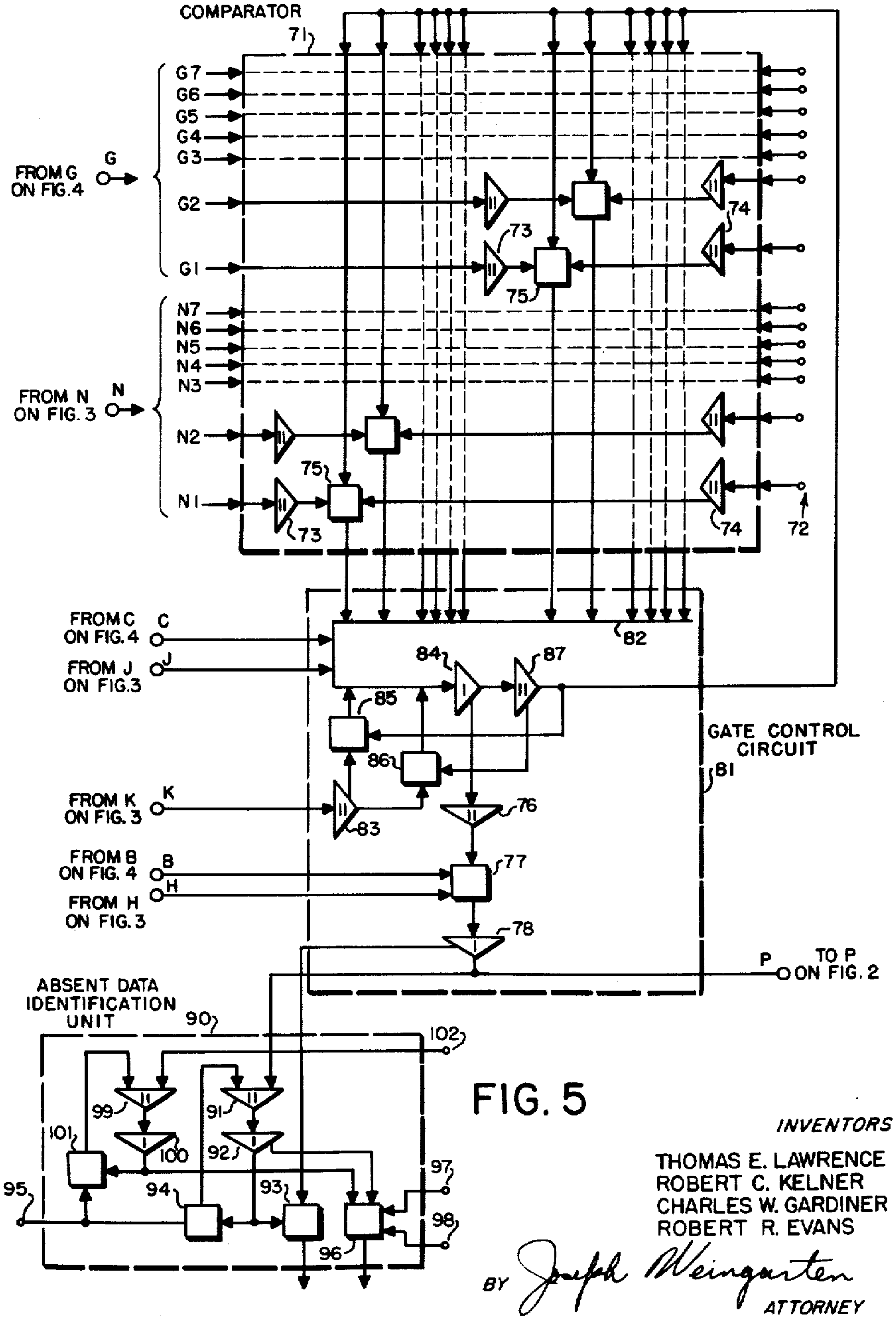

FIG. 5 shows a comparator 71 connected to receive the output signals of counters 34 and 54 in FIGS. 3 and 4 respectively, for comparison against a selected input signal applied to input terminals 72. The corresponding connections are indicated by terminals "G" and "N" respectively. The comparator comprises input amplifiers 73 for handling the signal in each signal path of both counter outputs and corresponding input amplifiers 74, each connected to one of terminals 72. In each signal path a gate 75 is connected to the direct signal output of amplifier 73 and the inverted signal output of amplifier 74. A gate control circuit 81 comprises an amplifier 84 having a buffer input 82 for receiving the output signals of each of gates 75. The inverted signal output of amplifier 84 is connected to an amplifier 76 the output of which is connected to a gate 77. The latter receives further input signals from the inverted outputs of amplifiers 37 and 49, shown in FIGS. 3 and 4 respectively. These connections are indicated in the drawings by respective terminals "H" and "B." The output of gate 77 is connected to an amplifier 78, whose direct output signal is fed to each of gates 16 in FIG. 2, the latter connection being indicated by terminal "P." The direct signal output of amplifier 84 is connected to an amplifier 87, the direct output of which, in turn, is connected to each of gates 75. The gate control circuit further comprises an amplifier 83 which receives the output signal of word end detector 31 shown in FIG. 3, such connection being indicated by terminal "K." A gate 85 derives its inputs from the inverted signal output of amplifier 83 and from the direct signal output of amplifier 87, respectively. The gate output is buffered to the input of amplifier 84. Additionally, the direct outputs of amplifiers 37 and 49, shown in FIGS. 3 and 4 respectively and indicated by terminals "J" and "C" respectively, are buffered to amplifier 84. A gate 86 derives its inputs from the direct signal output of amplifier 83 and from the inverted signal output of amplifier 87, its output being connected to amplifier 84.

As will be seen from a discussion of the operation set forth below, the circuitry directly associated with gate 86 may be varied, the arrangement shown being capable of transferring single data words only. For example, if it were desired to transfer entire data blocks, the output signal from the $\beta$ detector would be utilized, instead of the output signal from the word end detector. In that case, further modification of the above mentioned associated circuitry would be required in order to prevent an $\alpha$ symbol which occurs within a data block that is to be transferred entirely, from closing gate 77 and from creating a One pulse at terminal "J" in FIG. 5.

In order for the apparatus herein described to operate properly under all conditions, means must be provided to identify any data which is absent, such as Words 4 and 5 in Block I of Record (2), or Block II of the same record. This may be done in a variety of ways. The embodiment shown in FIG. 5 employs an absent data identification unit 90, comprising an amplifier 91 which has its input connected to the direct signal output of amplifier 78. The direct signal output of amplifier 91 is linked to amplifier 92, the direct signal output of which, in turn, is connected to gates 93 and 94. The latter gate has a second input connected to a signal source 95 and has its output buffered to amplifier 91. Source 95 may represent the apparatus for loading the addressed number into terminals 72 which produces a Zero pulse each time a new number is loaded. Gate 93 receives a second input from the inverted signal output of amplifier 78. In addition, there is an amplifier 99 which receives its input from signal source 102. Source 102 may represent means for indicating the initiation of the next higher order data unit which constitutes the aforesaid sequence of data units from which the addressed data unit is missing. In the instant case, where the sequence consists of words which constitute a data block, a block start detector is arranged to supply a single One pulse to amplifier 99 when the first character of each block is at terminals 12 in FIG. 2. Alternatively, source 102 may be chosen so as to supply One pulses at any time when the input data derived from counter 34 in FIG. 3 represents a number which is smaller than that portion of the data on terminals 72 which deals with the word address. The direct output signal of amplifier 99 is fed to amplifier 100, the direct signal output of which, in turn, is connected to gates 101 and 96. The former gate has a second input connected to signal source 95 and has its output buffered to amplifier 99. Gate 96 has another input connected to the inverted signal output of amplifier 92. Two signal sources 97 and 98 are respectively connected to gate 96. Source 97 may represent the positional block data portion of comparator 72, arranged to supply One pulses to gate 96 when there is a correspondence between the input data derived from counter 54 in FIG. 4 and that portion of the data on terminals 72 which deals with the block address. Source 98 may represent means for indicating the termination of the data unit, the initiation of which is indicated by source 102. In the instant case, a block end detector is arranged to supply Zero pulses to gate 96 under normal conditions, and a One pulse when a $\beta$ symbol appears at the outputs of amplifiers 18 in FIG. 2 to indicate the end of a block. Alternatively, source 98 may be chosen so as to make it unnecessary to await the end of the block before opening gate 96.

Means which are not herein shown are also provided for the positive identification of a desired record on a given track which cooperate with the system herein described to permit gates 16 in FIG. 2 to pass only the selected words on said record. These means may, by way of example, detect the end of the desired record and actuate gates 16 in response thereto. Alternatively, record selection may be obtained through data programming. Similarly, the pertinent magnetic track must be identified and selected in order to get at the desired information. Such track selection occurs elsewhere in the system, however, and is beyond the scope of the apparatus herein described.

In operation, the rotation of drum 10 in FIG. 2 permits constant readout of any magnetic track on the drum recording surface, there being a separate magnetic recording/readout head for each track. The information stored on a given track becomes periodically available at input terminals 12. If it is desired to read the name of the employee contained in Record (1) of a given track on the recording surface of drum 10 and to transfer this data to output shift register 15 for further processing, the appropriate positional identification of the data word containing this name in Record (1) must be fed to comparator 71 via terminals "G" and "N," i.e. the appropriate word must be addressed. As will appear from FIG. 1, the positional identification data "Block I, Word 2" must be placed on the terminals 72 of the comparator. It will be understood that the positional identification signal so fed to terminals 72 will be in binary code and will contain only the pertinent position numbers involved, i.e. 1, 2.

The word sequence of Block I is initiated by means of the characteristic (—) signal shown in FIG. 1 at the start of Block I. The signal so received prepares counter 34 in FIG. 3 for the word sequence by initiating the counting operation. Accordingly, counter 34 could be arranged to have the number 0 in code notation appear at its output, indicative of Word 0 immediately following. Word 0 will appear next on input terminals 12 followed by a characteristic (+) symbol to indicate its end. The latter symbol is recognized via terminals "L" by word end detector 31 which yields an output signal in response thereto. The latter output signal actuates counter 34 and causes the next succeeding number in the sequence, i.e. number 1 in the instant case, to appear at the counter output. At the end of Word 1 which is next in the sequence, a characteristic (—) symbol is encoded which is recognized by detector 31. The detector output signal actuates counter 34 in the manner hereinbefore explained to cause the number 2 to appear at the counter output. If it be assumed that counter 54 in FIG. 4, which counts the number of data blocks, yields the appropriate output signal so that the number 1, indicative of Block I, appears in binary code at the counter output, the total positional identification information then supplied to comparator 71 via terminals "G" and "N" comprises the numbers 1, 2 in binary code. Since this corresponds to the information on comparator input 72, the comparator output signal will denote equality. This signal causes gate control circuit 81 to open gates 16 via terminal "P" in order to permit Word 2 of Record (1), which now appears on the output of amplifiers 18 in FIG. 2, to be transferred to the output shift register. At the end of Word 2, in response to a signal from gate 86, the gate control circuit closes gates 16 and thereby prevents a further transfer of information from the drum to the output shift register. As previously explained, the last mentioned signal may be derived from different sources depending on its function in the gate control circuit. The embodiment shown in the drawings is capable of transferring single data words only.

Record (2), which may follow Record (1) on the same magnetic track of the recording surface, contains the equivalent information concerning another employee. If it is desired to read the names of all employees whose data records are stored on the same magnetic track, it is only necessary, in cooperation with the record identification means, to apply the same positional identification signal periodically to terminals 72 of the comparator, each record being arranged so that the employee's name appears as Word 2 of Block I. The procedure for reading out the names will then be identical to that described above. It should be noted that the desired information may be read out without the possibility of error caused by its varying physical location within different data records. Thus, in Record (1) the first letter of the employee's last name is recorded in the ninth space in Block I, allowing one six bit space for each character and each word end symbol. In Record (2) the employee's hourly pay takes one space less than that in Record (1) and his last name begins in eighth place in Block I. Since in both records the characteristic (—) symbol unequivocally indicates the end of the Word 1, the employee's name will be read out of the drum without introducing any ambiguity.

In actual practice, the operation hereinabove recited is complicated by the inherent delay in the response of the apparatus described. To overcome this difficulty, the counters must be arranged so that their output signals anticipate the next word in the sequence. This operation will become apparent from the previous example which is considered in greater detail below. Let it be supposed that Word 1 of Block I, which reads 1 2 2, is presently passing through shift register 11 in FIG. 2 at a point in time where the characteristic (+) symbol denoting the end of Word 0 is on amplifiers 8, and the decimal digit 1 of Word 1 is on amplifiers 6. As previously explained, the simultaneous pulsing of all "1" amplifiers alternates with the simultaneous pulsing of all "2" amplifiers once in each bit period. The pulsing of all "2" amplifiers transfers the data contained therein into the "1" amplifiers. In the present example, the (+) symbol will move to amplifiers 9 and the decimal digit 1 of Word 1 will move to amplifiers 7. The simultaneous pulsing of all "1" amplifiers will move the (+) symbol out of amplifiers 9 whence it appears at input terminals 12, while advancing the digit 1 to amplifiers 8. At the same time amplifiers 6 receive the digit 2, i.e. the second decimal digit of Word 2. The (+) symbol which was transferred out of the shift register is uniquely recognized via terminals "L" by word end detector 31, which yields an output pulse signal in response thereto. The pulsing of all "2" amplifiers transfers this detector pulse signal directly to the output of amplifier 35, and in inverted form to the output of amplifier 36. The inverted pulse signal from amplifier 36 comprises a Zero pulse which closes normally open gates 42 to prevent the recirculation of the data transferred out of amplifiers 41 by the last pulsing of all "2" amplifiers. Simultaneously, the direct pulse signal from amplifier 35 comprises a One pulse which opens normally closed gates 43 and passes into amplifier 40 in the first subcircuit, while transferring the output signal derived from amplifier 41 of each subcircuit to amplifier 40 of the next subcircuit. Thereafter, the pulsing of all "1" amplifiers transfers the data in amplifiers 40 to amplifiers 41, while simultaneously making it available at the output of counter 34. The code employed herein is such that one and only one of amplifiers 40 in each ring circuit of counter 34 will have a One pulse at its output for a given number, while the other amplifiers in each ring circuit will have a Zero pulse output signal. The counter is so arranged that the data which is at the output of amplifiers 40 following the last mentioned pulsing of all "1" amplifiers, indicates Word 2 to the comparator to which it is supplied via terminals "N." Normally open gates 42 and normally closed gates 43 cause the counter data to circulate within each subcircuit formed by interconnected units 40, 41 and 42. Accordingly, this data becomes available at the counter output every time the "1" amplifiers are pulsed. No change occurs in the counter output signal during the time period in which a particular word appears at input terminals 12 in FIG. 2. At the end of such a word, however, detector 31 responds to the word end symbol derived via terminals "L" and produces an output signal which advances the data in the counter by one subcircuit, in the manner described above. When the data in the last subcircuit is transferred out, it is fed back to gate 43 in the first subcircuit and hence back to amplifier 40 to complete the ring circuit. In the instant example, the counter output, indicative of Word 2, is fed to comparator 71 via terminals "N" where it is received by amplifiers 73. The output of the latter amplifiers is fed to gates 75. Simultaneously, the selected input signal on terminals 72, which is representative of Word 2, is supplied to amplifiers 74, the inverted output signal of which is fed to gates 75. A similar comparator input signal is received from counter 54 via terminals "G." When there is no correspondence between the data on the above mentioned inputs of the comparator, at least one of gates 75 will permit the passage of One pulses to buffer 82 and hence to amplifier 84. An interrogation signal at the input of amplifier 84 derives from amplifier 83 whose inverted output signal, in the absence of an input signal from word end detector 31 received via terminal "K," is also a One pulse which passes to amplifier 84 through gate 85. The inverted output signal from amplifier 84 represents a Zero pulse and, upon passing through amplifier 76, gate 77, and amplifier 78 to terminal "P," it leaves normally closed gates 16 undisturbed. The direct output signal of amplifier 84 is recirculated through amplifier 87 to gates 75. When there is correspondence between all the comparator data input signals, in the instant case when the numbers 2, 1 indicative of Word 2, Block I appear at the counter outputs, each of gates 75 is closed. Amplifier 84 is prevented from putting out an equality signal as long as it continues to receive One pulses through gate 85 from amplifier 83. When the (−) symbol indicative of the end of Word 1 causes detector 31 to supply a One pulse to amplifier 83 via terminal "K," the resultant interrogation input signal fed to amplifier 84 becomes a Zero pulse. Since all the input signals to amplifier 84 are now Zero signals, the inverted output signal of this amplifier becomes the required One pulse or equality signal. Provided gate 77 is open, this equality signal, upon being delayed one bit period by amplifiers 76 and 78, passes to gates 16 via terminal "P" and opens the latter at the instant when the first character of Word 2 appears at the output of amplifiers 18 in FIG. 2.

The function of the feedback loop which feeds the direct output signal of amplifier 87 to gate 85 and then back to amplifier 84, is to maintain gates 16 in FIG. 2 open while Word 2 is passing through. Specifically, gate 85 prevents the passage of One signals from amplifier 83 as long as it receives Zero input signals from amplifier 87. The inverted output signals of amplifier 83 will consist of One pulses unless an input signal from the word end detector is received. As explained above, the counter outputs will indicate Word 3 via terminals "G" and "N," while Word 2 is being read out. Since there is then no longer any correspondence between the counter outputs and the address of Word 2 on terminals 72 of the comparator, at least one of gates 75 will open. However, the comparator fails to yield a One pulse output signal because of the Zero output signal derived from amplifier 87 which is applied to each of gates 75. At the termination of Word 2, the word end detector pulses amplifier 83 via terminal "K," and the direct output signal of the latter amplifier cooperates with the One signal from the inverted output of amplifier 87 to open gate 86 and feed a One pulse to amplifier 84. The inverted output signal of the latter closes gates 16 via terminal "P" and the gate control circuit reverts to its original state.

If it were desired to read the Social Security number of every employee whose record appears on a given track, the operation would be similar to that described above. Accordingly, the positional identification signal 1, 6, indicative of Word 6 in Block I, is required on input 72 of the comparator of FIG. 5. In addition, at the end of each record a Zero must be applied to input 95 to restore unit 90 to its initial state. While Record (1) presents no further problems, it will be seen from FIG. 1 that employee Jones participates neither in the Payroll Savings Plan, the Group Hospitalization Plan, nor in the Employee Retirement Fund. Accordingly, no space is allotted in his record for such deductions from his pay. The absent word code, which forms a part of this invention, provides for the utilization of the additional recording space which thereby becomes available. In operation, the characteristic $\alpha$ symbol which follows the (+) symbol that terminates Word 2, is uniquely recognized by detector 47 shown in FIG. 3 via terminals "Q" which, in response thereto, feeds a One pulse signal to amplifier 36, delayed one bit period by amplifiers 37 and 38. The inverted output signal of the latter amplifier closes gates 42 to prevent the data in the counter from circulating within the counter subcircuits. The effect of this action, without opening gates 43, is to clear the counter of all data. Simultaneously, the output signal of amplifier 48 serves to open gates 46. The number 6, which is the number of the next occurring word in the sequence, is encoded immediately following the $\alpha$ symbol. This data will appear at input terminals 12 in FIG. 2 and hence on terminals "M," one half bit period before gates 46 shown in FIG. 3 are open and gates 42 are closed. In passing through code conversion unit 32, the data is delayed one half bit period by amplifiers 33, the direct and inverted output signals of which cooperate to convert it to the ring counter code. At the instant gates 42 are closed, the number 6 passes directly through gates 46 into counter 34. The operation thereafter is identical to that described above.

The operation of counter 54 shown in FIG. 4 is similar to the last mentioned operation of counter 34. The characteristic $\beta$ symbol encoded at the end of each block is uniquely recognized via terminals "A" by $\beta$ symbol detector 51 which feeds a signal, delayed one bit period by amplifiers 49 and 50, to amplifier 52. The direct output signal of amplifier 52 opens gates 53, while gates 61 are closed simultaneously by the inverted output signal of amplifier 52. The latter operation serves to clear counter 54. The number of the next occurring data block, which is encoded immediately following the $\beta$ symbol, appears at input terminals 12 of FIG. 2 and hence on terminals "E" one half bit period before gates 53 are open and gates 61 are closed. In passing through code conversion unit 39, the data is delayed one half bit period by amplifiers 44, the direct and inverted output signals of which cooperate to convert it to the ring counter code. At the instant gates 61 are closed, the number of the next occurring data block passes directly through gates 53 into the counter.

It will be seen that the block end code so provided may also operate as an absent block code. For example, if none of the information encoded in a block of data is applicable in an employee's record and the entire block may be omitted, this code provides for the utilization of the recording space so made available. Referring back to FIG. 1, if employee Jones never works overtime, Block II will be absent from Record (2). In this case the $\beta$ symbol following the end of Block I is succeeded by the number 3, i.e. the number of the next occurring block in the data record. This number passes into counter 54 via terminals "E" in the manner hereinbefore explained so that the counter output signal will indicate the number 3.

The output signal of counter 54 is taken from the output of amplifier 56 and is applied via terminals "G" to comparator 71 in the same manner as the output of counter 34. This completes the required positional input data which is compared against the positional data of the addressed word applied to terminals 72.

The end of each data block must be accompanied by a clearing of word counter 34 in FIG. 3 in order to accommodate the next word sequence. Accordingly, the direct output signal of amplifier 50 is fed to amplifier 36 via terminal "D" in order to open gates 42 and clear the counter. Simultaneously, the direct output signal of amplifier 52 is fed via terminal "F" to one of amplifiers 40 in each of the ring circuits of counter 34 in such a manner that the counter output will indicate the Word 0 one half bit period later to start the word sequence of the new data block.

The operation of the apparatus herein described must be such as to prevent the recorded absent data unit code from being transferred to the output shift register, in response to a signal on terminals 72 which is addressed to a word that would ordinarily appear in place of the absent data unit code. In preference to programming, the instant embodiment utilizes the $\alpha$ and $\beta$ detector output signals to achieve this end. For example, if it were desired to read out Word 3 in Block I of Record (2), without prior knowledge that no such word exists, the positional identification data 1, 3 would be placed on terminals 72 of the comparator, as heretofore. The appearance at input terminals 12 of FIG. 2 and hence at terminals "L" of the (—) symbol which terminates Word (1) in Block I, will cause comparator 34 to indicate Word 3 at its output one bit period later. As before, the resulting comparator equality signal must await the arrival of the gate control interrogating signal from detector 31 which is supplied via terminal "K" in response to the (+) symbol terminating Word (2). The appearance of the interrogating signal normally triggers the gate control circuit into supplying an output signal to terminal "P" which will open gates 16. In the instant case, the timing is such that the last mentioned output signal arrives at the output of amplifier 76 in FIG. 5 one and one half bit periods after the (+) symbol which terminates Word 2 appears at input terminals 12 in FIG. 2. Simultaneously, in response to the $\alpha$ symbol which is encoded immediately after the aforesaid (+) symbol, the inverted output signal of amplifier 37 closes gate 77 via terminal "H" to prevent the output signal of amplifier 76 from opening gates 16. At the same time the direct output signal of amplifier 37 is fed to amplifier 84 via terminal "J." The inverted output of the latter produces a Zero signal one half bit period later which will keep gates 16 closed. Concurrently, the One pulse signal from the direct output of amplifier 84 is circulated through its two associated feedback loops to maintain this condition until the arrival of the next word end symbol. It will be understood that the last mentioned operation is equally applicable where the absent block code is involved, gate 77 and amplifier 84 being connected to receive signals derived from detector 51 in FIG. 4.

The last described operation of the apparatus, which prevents the transfer of the code "$\alpha$6" in Record (2), is also operative to identify Word 3 in Block I as being absent. In order to prevent the malfunctioning of the apparatus, it is further necessary to identify Words 4 and 5 as being missing when these words are addressed on terminals 72. While this end may be achieved in a variety of ways, e.g. by programming, the absent data identification unit 90 shown in FIG. 5 represents an acceptable solution of this problem. In operation, the output of amplifier 78 is sampled to determine whether gates 16 are open or closed. If the last mentioned amplifier is putting out One pulses, these pulses pass to amplifiers 91 and circulate in the loop determined by amplifiers 91, 92 and gate 94. The latter will remain open as long as it receives One pulses from amplifier 92 and from source 95. The One pulse will continue to circulate in the above mentioned loop, even after gates 16 have closed. After the transfer of an addressed data unit has been completed, gates 16 will close in response to Zero signals supplied to them. When this occurs, the inverted output signal of amplifier 78 will be a One signal and gate 93 will open. The output signal from this gate will then represent the completed transfer of a data unit. A One pulse output signal from gate 96 will represent on attempted data transfer which was not completed because the addressed word was missing and hence, it may be utilized to indicate the absence of such a word. In the case mentioned above, where One pulses are circulating through loop 91—92—94, the inverted output signal of amplifier 92 will be a Zero signal. Accordingly, the output signal from gate 96 will be Zero and will not indicate an incomplete data transfer. If now Word 4 in Block I of Record (2) is addressed, signal source 95 will temporarily produce a Zero pulse which will close gates 94 and 101, thus clearing out any One signals which may be circulating in the loops 91—92—94 and 99—100—101. If source 102 provides One pulses at the start of each block, the normal One pulses must be restored at source 95 at, or before, the start of Block I. This is necessary so that the pulse put into amplifier 99 from source 102 at that time may recirculate in the loop formed by amplifiers 99 and 100 and gate 101. Since the addressed word does not exist, the direct output signal of amplifier 78 is Zero during the entire time Block I appears at input terminals 12 in FIG. 2. Accordingly, no One pulse is put into the loop 91—92—94 and amplifier 92, which receives Zero signals at its input, is now One. Since the correct block is being addressed in the comparator, the input signals to gate 96 from source 97 will be One pulses. When the $\beta$ symbol which terminates Block I appears at the outputs of amplifiers 18 in FIG. 2, a One signal from source 98 will produce a One output signal from gate 96, showing that the word was missing. The One pulse output signal of amplifier 100 which is supplied to gate 96 indicates that a block started after the new block and word address were fed to terminals 72; the One pulse output from the inverted output of amplifier 92 indicates that gates 16 have not been opened since the new word and block address were fed to terminals 72; the One pulse output from source 97 indicates that the correct block is being read; and the One pulse output from source 98 indicates that the end of a block has been reached. When all these conditions occur simultaneously they mean that the entire desired block was examined without finding the correct word. That word, therefore, must have been absent, as shown by the output of gate 96.

With the instrumentation described, the word and block number must be fed to terminals 72, and source 95 must be restored to its normal state of providing One signals before the start of the desired block. In addition, the fact that the word is missing is not determined until the end of the block. Alternative instrumentations may provide for source 102 to generate One signals if the word number in counter 34 of FIG. 3 is smaller than the word number addressed at terminals 72. Similarly, a possible instrumentation could provide for source 98 to generate One signals if the number in counter 34 is greater than the word number addressed. Both of the foregoing alternative instrumentations could be adopted together. With either one of the above mentioned instrumentations, gate 96 will produce a signal if a word is addressed at terminals 72 before it has occurred, or if it is still being addressed after it should have occurred without having produced an equality signal at the output of comparator 71.

It will be obvious that the absent data identification unit may be modified to identify missing data blocks. In that case it would be necessary to let source 97 indicate whether or not the desired record appears on input terminals 12 of FIG. 2 and to have source 98 indicate the end of each record or a point later than the desired one. Additionally, source 102 would have to indicate the start of a record or a point before the desired one.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. In an information processing system for operating upon a sequence of coded data units, the code including an absent data unit symbol succeeded by a number determinate of the next occurring data unit following a discontinuity in the data unit sequence, apparatus for transferring the data from input to output terminals comprising: a counter for counting each unit in the data unit sequence appearing at the input terminals, an absent data unit symbol detector, the detector in response to the occurrence in the sequence of an absent data unit symbol causing the counter to clear and then admit the number following the symbol, a comparator for comparing the output of the counter with a signal representative of an addressed one of the sequence of data units, and control means, the comparator being adapted upon the occurrence of a predetermined relationship between the compared signals to enable the control means to transfer the addressed data unit to the output terminals.

2. The apparatus of claim 1 wherein said control means is further adapted to be actuated by said symbol detector to prevent the transfer of said code to said ouput terminals, said control means being arranged to give precedence to the command of said symbol detector when there is a conflict, and said apparatus further including means for identifying an addressed data unit as absent, said last recited means being actuated by said control means to produce output signals indicative of the presence or absence in its own sequence of said addressed data unit, said identification means comprising gating means responsive to the end symbols of such higher order data units as are constituted by said sequence, said gating means being further responsive to the output signal of said comparator referable to the address of said higher order data unit, the output signals of said absent data identification means being controlled by said gating means, the latter being additionally responsive to a change of address.

3. A data transfer link for use with data processing systems employing a variable length data unit organization comprising at least one data record, each record comprising a sequence of data blocks, each of said blocks comprising a sequence of data words, each data word consisting of data characters binarily encoded in said record, each of said data blocks terminating in a binarily encoded characteristic block end symbol, each of said data words terminating in a binarily encoded characteristic word end symbol, an absent block code comprising the number of the next occurring block in said sequence of data blocks encoded immediately following each block end symbol, an absent word code comprising a binarily encoded characteristic absent word symbol succeeded by the number of the first occurring word following a discontinuity in said sequence of words, said data transfer link comprising input and output terminals, first gating means connected intermediate said terminals, a word end symbol detector adapted to yield an output signal whenever said word end symbol appears at said input terminals, a first counter adapted to be actuated by the output signal of said word end symbol detector, an absent word symbol detector adapted to yield an output signal whenever said absent word symbol appears at said input terminals, second gating means connected intermediate said input terminals and said first counter, said last mentioned output signal adapted to clear said first counter of all data contained therein and further adapted to actuate said second gating means to admit said word number encoded immediately following said absent word symbol to said first counter, a block end symbol detector adapted to yield an output signal whenever said block end symbol appears at said input terminals, a second counter adapted to be actuated by the output signal of said block end symbol detector, third gating means connected intermediate said input terminals and said second counter, said last mentioned output signal adapted to clear said second counter of all data contained therein and further adapted to actuate said third gating means to admit said block number encoded immediately following said block end symbol to said second counter, means for comparing the output signals of said first and second counters with a signal representative of an addressed word, said comparing means adapted to actuate said first gating means to enable the transfer of said addressed word from said input terminals to said output terminals upon the occurrence of a predetermined relationship between the compared quantities.

4. The apparatus of claim 3 wherein the output signal of said block end detector is further adapted to clear said first counter of all data contained therein and to initiate a new counting sequence.

5. The apparatus of claim 4 wherein said comparing means has a first input adapted to receive the output signal of said first counter, a second input adapted to receive the output signal of said second counter and a third input adapted to receive said signal representative of an addressed word for comparison against said first and second input signals, said representative signal positionally identifying the addressed word in said sequence, a gate control circuit connected intermediate said comparing means and said first gating means adapted to actuate the latter in response to the output signal of said comparing means to permit said addressed word to pass to the output terminals.

6. The apparatus of claim 5 wherein said gate control circuit is further adapted to be controlled by said word end symbol detector in overriding importance to the output signal of said comparing means.

7. The apparatus of claim 6 wherein said gate control circuit is additionally adapted to be actuated by said absent data symbol detectors to prevent the transfer of said absent word code and of said absent block code to said output terminals, said gate control circuit being arranged to give precedence to the command of said absent data symbol detectors when there is a conflict.

8. The apparatus of claim 7 and further comprising means for identifying an addressed word as absent, said last recited means adapted to be actuated by said gate control circuit to produce output signals indicative of the presence or absence of the addressed word from its sequence within a block, said identification means comprising fourth gating means responsive to the appearance of block end symbols, said fourth gating means being additionally responsive to the output signal of said comparing means referable to the block address, the output signals of said absent word identification means being controlled by said fourth gating means, the latter being further responsive to a change of address.

9. The apparatus of claim 7 and further comprising means for identifying an addressed word as absent, said last recited means adapted to be actuated by the said gate control circuit to produce output signals indicative of the presence or absence of the addressed word from its sequence within a block, said identification means comprising fourth gating means responsive to the magnitude of the sequential number of said addressed word relative to the output signal from said second counter, said fourth gating means being further responsive to the output signals from said comparing means referable to the block address, the output signals of said absent word identification means being controlled by said fourth gating means, the latter being additionally responsive to a change of address.

10. The apparatus of claim 8 wherein said data transfer link comprises a plurality of separate signal paths, each of said paths comprising a pair of input terminals, the signal present in each path appearing directly on one of said pair of terminals and in inverted form on the other of said pair of terminals, the signals simultaneously appearing on said pairs of terminals being completely determinate of one of said data characters or of one of said characteristic symbols, each of said symbol detectors being connected to selected terminals of said pairs of input terminals to enable it to uniquely recognize its particular symbol, code conversion means connected intermediate said input terminals and each of said second and third gating means, said code conversion means converting the numbers of the absent data unit code into code adapted for use by said first and second counters.

References Cited in the file of this patent

UNITED STATES PATENTS

| | | |
|---|---|---|
| 2,508,554 | Warwick | May 23, 1950 |
| 2,549,071 | Dusek | Apr. 17, 1951 |
| 2,679,638 | Bensky | May 25, 1954 |
| 2,739,301 | Greenfield | Mar. 20, 1956 |
| 2,782,398 | West | Feb. 19, 1957 |
| 2,853,698 | Nettleton et al. | Sept. 23, 1958 |
| 2,854,652 | Smith | Sept. 30, 1958 |
| 2,874,901 | Holmes | Feb. 24, 1959 |
| 2,891,723 | Newman | June 23, 1959 |
| 2,916,210 | Selmer | Dec. 8, 1959 |
| 2,954,166 | Eckdahl | Sept. 27, 1960 |